No. 820,258. PATENTED MAY 8, 1906.
R. H. RENDAHL.
DETECTOR FOR ELECTROMAGNETIC WAVES OR THE LIKE.
APPLICATION FILED APR. 18, 1905.
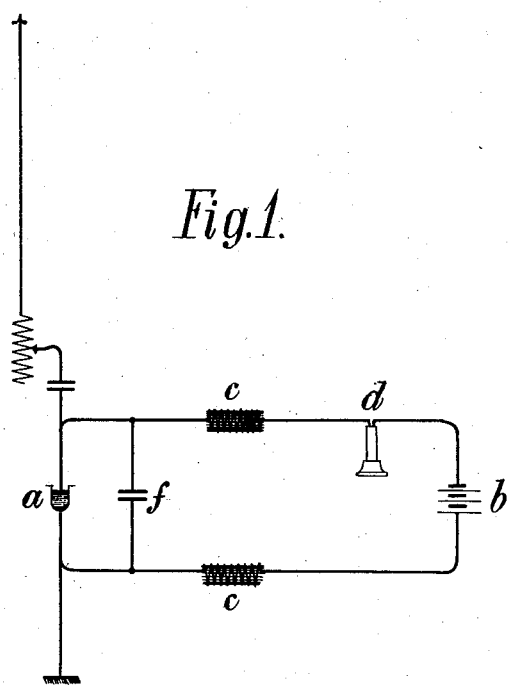
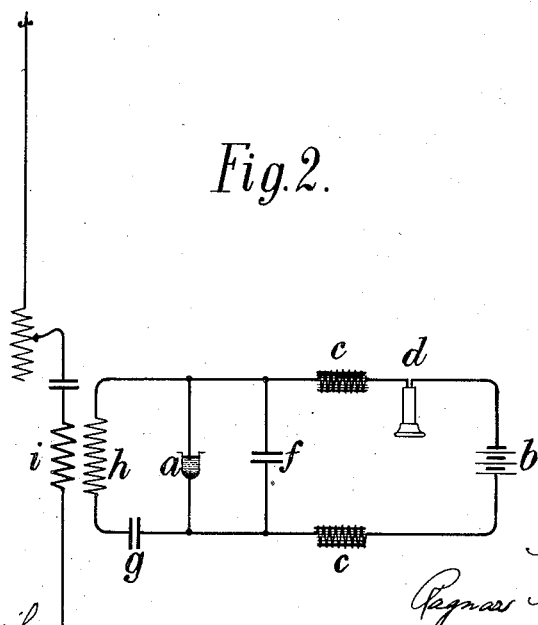

UNITED STATES PATENT OFFICE.

RAGNAR H. RENDAHL, OF BERLIN, GERMANY, ASSIGNOR TO GESELLSCHAFT FÜR DRAHTLOSE TELEGRAPHIE M. B. H., OF BERLIN, GERMANY.

DETECTOR FOR ELECTROMAGNETIC WAVES OR THE LIKE.

No. 820,258.   Specification of Letters Patent.   Patented May 8, 1906.

Application filed April 18, 1905. Serial No. 256,290.

*To all whom it may concern:*

Be it known that I, RAGNAR HAKAN RENDAHL, engineer, a subject of the King of Sweden and Norway, residing at 13 Hollmannstrasse, Berlin, S. W., Germany, have invented certain new and useful Improvements in Detectors for Electromagnetic Waves or the Like, of which the following is a full, clear, and exact description, reference being had to the accompanying drawings, forming a part of this specification.

This invention relates to a detector for electromagnetic waves or other weak impulses, which detector consists, substantially, of an electrolytic cell of a well-known type with a minute anode. In particular it relates to those detectors in which the electrolytic cell is combined with means for polarizing the cell and means for passing the waves or impulses through the cell, thereby causing a partial or complete depolarization of the cell. This partial or complete depolarization of the cell causes a strengthening of the current flowing through it, which may be ascertained by suitable means—for instance, by means of a telephone. Now experiments have shown that several detectors of this kind in spite of their external or constructional similarity differ considerably one from another in their electrical behavior. If the action of the cells under the influence of electric waves be observed by means of a telephone in some of the cells, which as compared with one another are externally or constructionally completely similar, a maximum volume of sound in the telephone is attained with a definitely-determined wave length of the impulse acting on the cells, while in other cells the strength of the sound remains constant with any wave-length. Some cells even alter their action as regards this point. Experiments which were made to investigate this behavior brought me to the opinion that the electrolytic cell does not directly transmit the entire strength of current flowing through it, but rather in its action must be considered as a pure capacity, (condenser capacity,) an electrolytic capacity (capacity of polarization) serving as rectifier, and an ohmic resistance, all connected in parallel, and that the mutual proportion between these three electric quantities does not remain necessarily constant, owing to the external or constructional similarity of the cells so far as this is attainable by manufacture. The percentage of consumption of energy of the cells per oscillation—that is to say, the proportion of the energy consumed per oscillation and the total amount of energy of the oscillation conveyed to the cell—depends now on this mutual ratio of the three electric quantities; in fact, it is smaller the greater the electrolytic capacity of the cell.

If the wave-detector be considered in combination with a receiver for space telegraphy, the cell must have a certain percentage of consumption of energy per oscillation in order to best utilize an oscillation of given damping, which is to be received—that is to say, to make it more readily distinguishable in the telephone—and the percentage of consumption of energy of the cell per oscillation must, on the other hand, be made as small as possible—that is to say, the electrolytic capacity of the cell kept as large as possible in order to produce very sharp tuning, avoiding the maximum intensity. In order, therefore, first, on receipt of waves with different damping to obtain the greatest intensity, second, to be able to suitably increase the sharpness of the tuning, and, third, to be unaffected by unavoidable inequalities in the manufacture, it is necessary to be able to regulate or correct the percentage of consumption of energy of the cell per oscillation—that is to say, the proportion between the pure capacity action and the properties of the cell-consuming energy by electric rectifier and ohmic resistance. Various experiments have been made to obtain this by a variation of the superficial areas of the electrodes—for instance, by varying the amount immersed. These methods, however, do not allow of the alteration of one quantity only, but involve the simultaneous alteration of all the said electrical quantities of the cell. Now this invention affords a means of varying the non-energy-consuming property of the cell—that is to say, the pure condenser action independently of the energy-consuming properties—namely, electrolytic capacity and ohmic resistance—and consists in connecting an adjustable condenser in parallel with the cell.

In the accompanying drawings two receiver-stations for wireless telegraphy are shown diagrammatically.

Figure 1 shows a receiver in which the electrolytic cell $a$ is directly inserted in the aerial conductor. The source of current $b$ is connected with the electrodes of the cell by means of choking-coils $c$, in the circuit of which source of current a telephone $d$ is inserted. The adjustable condenser $f$ lies in parallel with the electrolytic cell.

In the receiver shown in Fig. 2 the electrolytic cell $a$ lies in a separate detector-circuit containing the condenser $g$ and the secondary coil $h$ of a transformer. The primary coil $i$ of the transformer is inserted in the receiver-circuit. The battery $b$ is connected through choking-coils $c$ to the cell, and in parallel with this a condenser $f$ is inserted. In the latter case the maximum receiver intensity for the given damping of the transmitter and receiver necessitates not only a certain adjustment of the condenser inserted in parallel to the cell, but also a certain degree of the coupling between the receiver and the indicator circuit—that is to say, a certain speed of the traveling of energy from the receiver-circuit to the detector-circuit.

It follows without further explanation from what has been hereinbefore stated that the sizes of the most favorable condenser parallel to the cell may serve as a scale for the damping of the transmitter.

Having explained my invention, what I claim, and desire to secure by Letters Patent, is—

1. In apparatus of the character described, the combination with an electrolytic detector, of means for varying or adjusting the non-energy-consuming property or factor of said detector independently of the energy-consuming properties thereof.

2. In a detector of electromagnetic waves or other feeble electrical impulses, the combination of an electrolytic cell, means for polarizing such cell, a condenser parallel to said cell, means for passing the waves or impulses through the cell and means for observing increases in current caused by said waves or impulses.

3. In a detector of electromagnetic waves or other feeble electrical impulses, the combination of an electrolytic cell having a minute anode and a cathode of greater surface, means for polarizing such cell, a condenser parallel to said cell, means for passing the waves or impulses through the cell and means for observing increases in current caused by said waves or impulses.

4. In a detector of electromagnetic waves or other feeble electrical impulses, the combination of an electrolytic cell, a source of electromotive force for polarizing such cell and producing at the cell a voltage above the decomposition voltage of the cell, a condenser parallel to said cell, means for passing the waves or impulses through the cell and means for observing increases in current caused by the cell by the influence of said waves or impulses.

5. In a detector of electromagnetic waves or other feeble electrical impulses, the combination of an electrolytic cell having a minute anode, a local circuit connected across the cell and including a source of direct electromotive force having its positive pole connected with the minute anode and acting to polarize the cell, a condenser parallel to said cell, means for passing the waves or impulses through the cell and means for observing increases in current caused by a depolarization of the cell by the influence of said waves or impulses.

6. In a receiver for space telegraphy the combination of an electrolytic cell conductively connected with the receiving-circuit, a local circuit connected across the cell and including a source of direct electromotive force for polarizing such cell and producing at the cell a voltage above the decomposition voltage of the cell, a condenser of a variable capacity parallel to the cell and means for observing increases in current caused by a depolarization of the cell by the influence of the waves produced in the receiving-circuit.

7. In a receiver for space telegraphy the combination of an oscillating circuit including a self-induction, a condenser and an electrolytic cell in series and inductively connected with the receiving-circuit, a source of electromotive force for polarizing the said cell and producing at the cell a voltage above the decomposition voltage of the cell, a condenser of a variable capacity parallel to the cell and means for observing increases in current caused by a depolarization of the cell by the influence of the waves produced in the said oscillating circuit.

In witness whereof I hereunto subscribe my name this 3d day of April, A. D. 1905.

RAGNAR H. RENDAHL.

Witnesses:
WOLDEMAR HAUPT,
HENRY HASPER.